No. 704,140. Patented July 8, 1902.
L. H. STOCKS.
MEANS OR APPARATUS FOR COOKING EGGS.
(Application filed July 1, 1901.)
(No Model.)
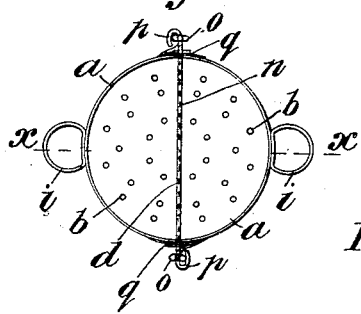
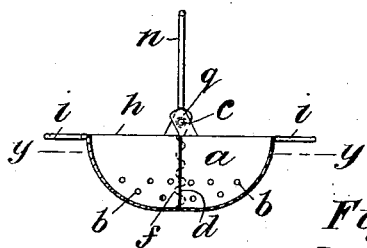
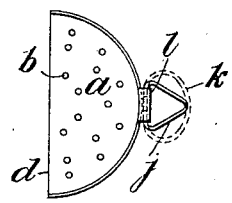
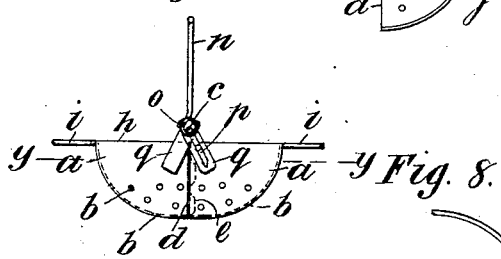
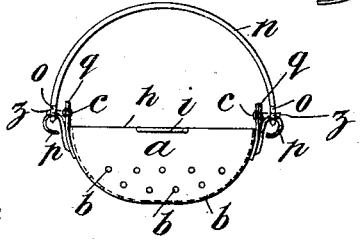
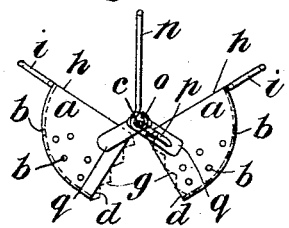
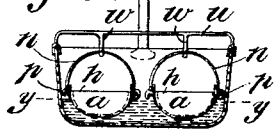
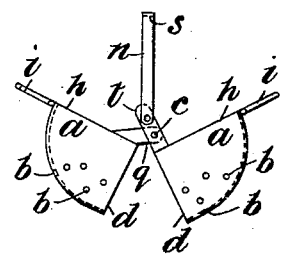
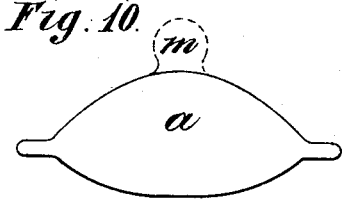
Witnesses:-
William Sadler
Annie Park
Inventor.
Lucy Harriet Stocks
by
H. Fairburn Hart
Attorney.

UNITED STATES PATENT OFFICE.

LUCY HARRIET STOCKS, OF LEEDS, ENGLAND.

MEANS OR APPARATUS FOR COOKING EGGS.

SPECIFICATION forming part of Letters Patent No. 704,140, dated July 8, 1902.

Application filed July 1, 1901. Serial No. 66,735. (No model.)

*To all whom it may concern:*

Be it known that I, LUCY HARRIET STOCKS, a subject of the King of Great Britain and Ireland, residing at Leeds, in the county of York, England, (whose post-office address is Norfolk House, Chapel Allerton, Leeds, England,) have invented new and useful Improvements in Means or Apparatus for Cooking Eggs, of which the following is a specification.

This invention relates to improvements in means or apparatus for cooking eggs—that is to say, by the process known as "poaching."

The object of this invention is to provide simple and ready means for poaching eggs, hereinafter termed the "egg-poacher," which readily enables a person to easily dish or serve them in, say, a circular or other desired form without there being so great a danger of breaking the yolk or formation, as at present. I attain this object by apparatus illustrated in the accompanying drawings, in which—

Figure 1 is a sectional elevation of the egg-poacher on line $x$ $x$, Fig. 2; Fig. 2, a plan looking at the top; Fig. 3, a front elevation; Fig. 4, an end elevation; Fig. 5, a front elevation of the egg-poacher shown partially open; Fig. 6, a part plan of the egg-poacher with a triangular loop attached thereto; Fig. 7, a part plan of the egg-poacher with a projection formed thereon; Fig. 8, a part sectional elevation of a means of attaching a handle for lifting and carrying purposes; Fig. 9, a front elevation of egg-poacher, showing another means of attaching said handle thereto; Fig. 10, a plan of the blank out of which one part of the egg-poacher is formed; Fig. 11, a sectional elevation showing means for using two egg-poachers at a time.

$a$ is the body or main portion, hereinafter termed the "body" of the egg-poacher, which is made in any desired size and in section is concavo-convex in shape as well as in outline—such as, for example, say, circular at the top—as shown at Fig. 2, and dished or curved to form a concavo-convex shape or semisphere, or nearly so, between its upper edge and base, as shown at Figs. 1, 3, and 4. The body $a$ is made of thin metal, either plain or enameled—such as, say, tin or thin sheet iron or steel—which may be first cut out in a blank shaped somewhat as shown at Fig. 10 and afterward stamped or otherwise formed to the desired concavo-convex shape. The body $a$ is made in two portions, which are perforated at $b$ and hinged or jointed together by the pin or pivot $c$—that is, at a suitable point above the top or upper surface $h$—in order that the said two portions may open outward in opposite directions, as shown at Fig. 5, from their central line $d$ of division for allowing the poached egg to be removed from the poacher and deposited where required. The line $d$ of division may be perfectly straight or plain in full lines at Figs. 1, 3, and 5, or it may be, say, of an irregular formation, as shown in dotted lines at $e$, Fig. 3, or curved, or wavy, or corrugated, as shown in dotted lines at $f$, Fig. 1, or serrated, as shown in dotted lines at $g$, Fig. 5; but in whatever manner it is formed it must be so arranged that edges of the two portions of the body $a$ that come together will fit one into or abut against each other without leaving an opening through which any portion of the egg may escape. The upper edge $h$ of each of the said portions forming the body $a$ is provided with a projection arranged at, say, a right or other convenient angle to its main or body part to form a handle or ledge, hereinafter termed a "handle" $i$, for opening purposes.

In some cases the handle $i$ is formed, as shown at Fig. 2 in the drawings, by soldering or otherwise rigidly fixing a circular-shaped loop to the upper surface, or the said triangular-shaped wire loop (shown in full at $j$, Fig. 6) or a circular loop $k$ (shown in dotted lines at Fig. 6) may be jointed thereto by bending a portion $l$ of the upper surface $h$ over the said loop, so as to inclose a portion of the same, or the said handle may be formed out of the same piece of metal or blank as the body, as shown at $m$, Fig. 7. In the latter case the handle $m$ would be bent at or about a right angle at the same time that the body $a$ is being dished or curved to the required shape.

By arranging the pivot $c$ above the upper surface $h$ and making the handles $i$ to project outward in a horizontal direction the two semispherical portions of the body $a$ will by their own weight and gravity be automatically made to abut and retained in a closed position at their line of division during the cooking or poaching operation without the employment of any fastening device—such as, say, a catch, bolt, or pin or the like.

The egg-poacher is also provided with a handle $n$ for inserting and holding it in as well as removing it from the vessel containing the boiling water employed for cooking purposes. The handle $n$ is arranged to be fixed to opposite points of the top of the egg-poacher, and its ends may also be arranged to form pivots upon which the two said portions of the semisphere may turn, or separate pivots may be employed therefor.

In the drawings the handle $n$ is shown made of wire, with a loop $o$ at each end, which is made to pass through a loop $p$, fixed to the body portion $a$, as shown at Fig. 4. In this case a joint or pivot pin $c$ is made to pass through the projections $q$, which form part of the body $a$, or the loops $p$ may be dispensed with and the pivot-pin $c$ prolonged for the loops $o$ to pass over, as shown in dotted lines at $z$, Fig. 4, or, as at Fig. 8, both the joint-pin or pivot $c$ and loops $p$ may be dispensed with and the ends of the handle $n$ may be made to pass through the projections $q$ and then riveted or bent over to form a hook, as shown at $r$, thereby forming both the joint-pin or pivot $c$ and attachment for the handle $n$, or the handle $n$ may be formed, as at Fig. 9, of a strip of metal, with the edges $s$ turned over onto the inner side. The projection in this case is made longer than the projection $q$, and the former is jointed to the latter by a pin $c$, as at Fig. 1. The handle in this case is attached to the longer projection $t$ in a similar manner, as described at Fig. 8. The normal position of the handle $n$ is vertical, as shown.

When it is desired to use more than one egg-poacher at a time, then a metal bridge-piece $u$, Fig. 11, may be arranged to clip or rest upon the upper edge of a saucepan or other receptacle containing boiling water. The bridge $u$ has attached to it any desired number of pendent fixed or adjustable hooks $w$ (two fixed hooks are shown in the drawings; but the number may be varied as circumstances require) for suspending and holding the egg-poachers in the boiling water—say between the upper row of perforations $b$ and the edge $h$—that is, up to or about the line $y\ y$, Figs. 1 and 3. The blank out of which the body $a$ is formed having been cut to the desired shape—say as shown at Fig. 10—and dished or curved by, say, stamping to the shape shown at Fig. 1, the perforations $b$ being made either prior or subsequent to the curving or shaping operation, the two portions of the body $a$ are then jointed together, as previously described, and the handle $n$ attached thereto.

To cook or poach an egg, I proceed as follows: The two portions of the body $a$ are closed together, as shown at Figs. 1 and 3, and are kept closed and made to abut at their line of division by their own weight, as previously described, the inside of the egg-poacher preferably, though not necessarily, being lined or covered with butter or other fatty material. The egg-poacher is then held or supported, say, by resting on its base, for receiving the white and yolk of the egg. After its shell has been cracked and severed in the usual manner the white and the yolk are placed in the recessed or concave portion of the semispherical body. The egg-poacher is then raised by the handle $n$, care being taken to keep edges of each portion $a$ that abut at the division-line together, when it is placed and held until the cooking or poaching operation is completed, say, by the cook or by the bridge $u$ and hooks $w$ in boiling water contained in, say, a saucepan, up to or about the line $y\ y$, care being taken not to allow the boiling water to pass over the edge $h$ into the egg-poacher and onto the egg. The perforations $b$ permit of the boiling water coming in contact with the egg during the setting and cooking of the same, as well as permitting of any water to drain away on completion of the cooking operation. When the cooking and poaching operation is completed, the egg-poacher is raised by the handle $n$ from, say, the saucepan. The poached or cooked egg can then be deposited upon, say, a piece of toasted bread or other food or into a receptacle by opening the two portions $a$ outward, as shown at Fig. 5, by placing a finger on the under side of each of the handles $i$ and drawing them toward the handle $n$, thereby causing the portions $a$ to turn on their joint or pivot pin $c$. On opening the egg-poacher as described the cooked or poached egg will at once pass through the opening or aperture thus formed without there being so great a danger of breaking or injuring the yolk or its formation as at present.

Having now described the nature of this invention and how it may be carried into practice, what I claim, and desire to secure by Letters Patent, is—

1. In an egg-poacher the combination of a semispherical and perforated body divided into two portions jointed together at a point above the upper edge, a horizontally-projecting handle attached to the upper edge of each portion of the semispherical body for opening purposes, and a handle attached to the portions of the semispherical body above the upper edge for carrying purposes substantially as set forth.

2. In an egg-poacher, the combination of a perforated semispherical body formed in two portions out of a blank stamped to a concavo-convex shape provided with an irregular division-line at the points where the two portions meet and fit into each other, projections on the said semispherical body portion by which the said two portions are jointed together above their upper edge, a pivot-pin on which the said two parts turn, and horizontally-projecting loop-handles on the semispherical body portion for opening purposes, as set forth.

3. In an egg-poacher, the combination of a perforated body formed in two portions, each portion having projections by which the body portions are jointed together above their upper edge, said projections being of different lengths, a pivot-pin for jointing the two body portions together, handles attached as described to upper edge of said body portions for opening purposes, and a handle for carrying purposes attached to the longer projections, substantially as set forth.

In testimony whereof I have signed my name to this specification in the presence of two subscribing witnesses.

LUCY HARRIET STOCKS.

Witnesses:
WILLIAM SADLER,
ANNIE PARK.